(12) United States Patent
Scheer et al.

(10) Patent No.: US 8,222,320 B2
(45) Date of Patent: Jul. 17, 2012

(54) HIGH HEAT RESISTANT POLYMER COMPOSITIONS HAVING POLY(LACTIC ACID)

(75) Inventors: Frederic Scheer, El Segundo, CA (US); William E Kelly, El Segundo, CA (US)

(73) Assignee: Cereplast, Inc., El Segundo, CA (US)

( * ) Notice: Subject to any disclaimer, the term of this patent is extended or adjusted under 35 U.S.C. 154(b) by 0 days.

(21) Appl. No.: 12/850,310

(22) Filed: Aug. 4, 2010

(65) Prior Publication Data
US 2012/0035287 A1    Feb. 9, 2012

(51) Int. Cl.
*C08K 9/10* (2006.01)
*C08K 3/26* (2006.01)

(52) U.S. Cl. .......... 523/210; 523/206; 524/425
(58) Field of Classification Search .......... 523/206, 523/210; 524/425
See application file for complete search history.

(56) References Cited

U.S. PATENT DOCUMENTS

2008/0113887 A1*   5/2008   Scheer et al. .......... 508/136
2008/0153940 A1*   6/2008   Scheer et al. .......... 523/124

* cited by examiner

*Primary Examiner* — Peter Szekely

(57) ABSTRACT

High heat resistant polymer compositions having poly(lactic acid) and methods of making the high heat resistant polymer compositions are provided. In a general embodiment, the present disclosure provides a polymer composition including a poly(lactic acid), an aliphatic polyester, and an organically coated calcium carbonate.

34 Claims, No Drawings

HIGH HEAT RESISTANT POLYMER COMPOSITIONS HAVING POLY(LACTIC ACID)

BACKGROUND

The present disclosure relates to polymer compositions. More specifically, the present disclosure relates to high heat resistant polymer compositions, methods for making and using the high heat resistant polymer compositions and biodegradable articles made from the high heat resistant polymer compositions.

Packaging materials and disposable houseware items, cups and cutlery are used widely nowadays and allow food material to be sold and/or consumed under hygienic conditions. Such disposable materials and objects are highly desired by consumers and retailers because they may be simply disposed of after use and do not have to be washed and cleaned like conventional dishes, glasses or cutlery.

Unfortunately, the widespread and growing use of such disposable materials results in a mounting amount of litter produced each day. Currently, the plastic waste is either provided to garbage incinerators or accumulates in refuse dumps. These methods of waste disposal cause many problems for the environment.

Due to environmental concerns, biodegradable products are a fast growing segment for packaging materials and houseware items. Biodegradable materials made from lactide, poly lactic acid and related compounds are known. However, such polymers have limitations in terms of melt strength/heat resistance. As a result, the polymers have limited usefulness when it comes to being used in conjunction with high temperatures applications.

SUMMARY

High heat resistant polymer compositions having poly(lactic acid) and methods of making the high heat resistant polymer compositions are provided. In a general embodiment, the present disclosure provides a high heat resistant polymer composition including one or more poly(lactic acid)s, one or more aliphatic polyesters, and one or more organically coated calcium carbonates. The high heat resistant polymer composition can be resistant to temperatures greater than about 165° F. while still retaining its structural properties.

In an embodiment, the poly(lactic acid) ranges from about 10% to about 45% by weight. In another embodiment, the aliphatic polyester ranges from about 5% to about 65% by weight. The aliphatic polyester can be a co-polyester polymer with adipic acid, co-polyester polymer with succinic acid, poly(epsilon caprolactone) or a combination thereof.

In an embodiment, the organically coated calcium carbonate ranges from about 40% to about 75% by weight. In other embodiment, the organically coated calcium carbonate ranges from about 45% to about 65% by weight.

In an embodiment, the high heat resistant polymer composition includes nanoparticles of one or more mineral materials. The nanoparticles can have a size ranging between about 20 and about 500 nanometers. The nanoparticles can also have a degree of purity of at least 99.9%.

In an embodiment, the high heat resistant polymer composition includes one or more components such as plasticizers, flow promoters, polymer processing aids, slip agents, viscosity modifiers, chain extenders, nanoparticles, spherical glass beads, organic fillers, inorganic fillers, fibers, colorants, antimicrobial agents or a combination thereof.

In another embodiment, the present disclosure provides a method of producing an article including a high heat resistant polymer composition. The method comprises combining a poly(lactic acid), an aliphatic polyester, and an organically coated calcium carbonate to produce a polymer blend. The method further comprises extruding the polymer blend to form an extrudate and forming the extrudate into an article. The article can also have high heat resistant properties and be biodegradable.

In an embodiment, the article can be polymer foams, toys, computer casing, DVDs, toiletries, combs, consumer products, cellular phone casings, bags, foam material products, packaging, automobile parts, cookware or a combination thereof.

In an embodiment, the forming is done by a process such as injection molding, thermoforming, film blowing, stretch blow molding, extrusion blow molding, extrusion coatings, profile extrusion, film extrusion, cast films, cast products or a combination thereof.

In an alternative embodiment, the present disclosure provides a method of making a polymer film. The method comprises combining a poly(lactic acid), an aliphatic polyester, and an organically coated calcium carbonate to produce a polymer blend, and forming a polymer film from the polymer blend. The method can further comprise applying the film to an article including a material selected from the group consisting of paper, plastics, wood, composite materials and combinations thereof.

In an embodiment of the methods, the poly(lactic acid) ranges from about 10% to about 45% by weight. In another embodiment of the methods, the aliphatic polyester ranges from about 5% to about 65% by weight.

In an embodiment of the methods, the organically coated calcium carbonate ranges from about 40% to about 75% by weight. In another embodiment of the methods, the organically coated calcium carbonate ranges from about 45% to about 65% by weight.

In an embodiment of the methods, the polymer blend includes nanoparticles of one or more mineral materials. In another embodiment of the methods, the polymer blend includes one or more components such as plasticizers, flow promoters, polymer processing aids, slip agents, viscosity modifiers, chain extenders, nanoparticles, spherical glass beads, organic fillers, inorganic fillers, fibers, colorants, antimicrobial agents or a combination thereof.

In yet another embodiment, the present disclosure provides a biodegradable article including a high heat resistant polymer composition including a poly(lactic acid), an aliphatic polyester, and an organically coated calcium carbonate.

In still another embodiment, the present disclosure provides an article including a polymer composition comprising about 10% to about 45% by weight of a poly(lactic acid), about 5% to about 65% by weight of an aliphatic polyester, and about 40% to about 75% by weight of an organically coated calcium carbonate. The article can further include nanoparticles of a mineral material. The article can be polymer foams, toys, computer casing, DVDs, toiletries, combs, consumer products, cellular phone casings, bags, foam material products, packaging, automobile parts, cookware or a combination thereof.

An advantage of the present disclosure is to provide an improved high heat resistant polymer composition.

Another advantage of the present disclosure is to provide a method of making an improved high heat resistant polymer composition.

Yet another advantage of the present disclosure is to provide articles having an improved biodegradability and high heat resistance.

Additional features and advantages are described herein, and will be apparent from the following Detailed Description.

DETAILED DESCRIPTION

Polymer compositions having poly(lactic acid) ("PLA") and methods of making and using the polymer compositions are provided. In a general embodiment, the polymer compositions include PLA, an aliphatic polyester, and an organically coated calcium carbonate. The polymer compositions have a high heat resistance not found with typical PLA compositions.

As used herein, the term "high heat resistant" refers to being resistant to temperatures at least greater than about 165° F. while still retaining most if not all of original structural properties. In alternative embodiments, the high heat resistant polymer compositions can be resistant to temperatures greater than about 170° F., 175° F., 180° F., etc., while still retaining their structural properties.

The high heat resistant polymer compositions can also be biodegradable and used to give products or articles biodegradable properties. The high heat resistant polymer compositions can be made using co-rotating Twin Screw extruders for extrusion and also blending and mixing methods with high speed blenders and/or ribbon blenders depending of the characteristics of the polymer compositions that are desired.

PLA may be represented by the following structure:

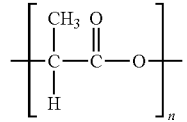

wherein n for example can be an integer between 10 and 250. PLA can be prepared according to any method known in the state of the art. For example, PLA can be prepared from lactic acid and/or from one or more of D-lactide (i.e. a dilactone, or a cyclic dimer of D-lactic acid), L-lactide (i.e. a dilactone, or a cyclic dimer of L-lactic acid), meso D,L-lactide (i.e. a cyclic dimer of D- and L-lactic acid), and racemic D,L-lactide (racemic D,L-lactide comprises a 1/1 mixture of D- and L-lactide).

PLAs resemble clear polystyrene and have good gloss and clarity for aesthetic appeal, along with physical properties well suited for use as fibers, films, and thermoformed packaging. PLA is biocompatible and has been used extensively in medical and surgical applications, e.g. sutures and drug delivery devices. Unfortunately, PLA present major weaknesses such as brittleness as well as low thermal resistance, for example, at about 136° F. (58° Celsius) and moisture-related degradation, limiting a lot of commercial applications. However, even at 108° F. (42° C.), which relates to the on-set of the glass transition, the un-crystallized PLA may incur physical distortion.

It has been surprisingly found that the polymer compositions according to embodiments of the present disclosure provide physical properties related to high heat resistance that are not inherent to PLA and provide significant improvements with respect to the processability and production costs along with improved flexibility and ductility without decreasing their biodegradability.

In an embodiment, the PLA ranges from about 10% to about 45% by weight of the high heat resistant polymer composition. More specifically, the amount of the PLA can be about 10%, 15%, 20%, 25%, 30%, 35%, 40%, 45% by weight and the like. It should be appreciated that any two amounts of the PLA recited herein can further represent end points in a preferred range of the PLA. For example, the amounts of 20% and 35% by weight can represent the individual amounts of the PLA as well as a preferred range of the PLA between about 20% and about 35% by weight.

In another embodiment, the aliphatic polyester ranges from about 5% to about 65% by weight of the high heat resistant polymer composition. More specifically, the amount of the aliphatic polyester can be about 5%, 10%, 15%, 20%, 25%, 30%, 35%, 40%, 45%, 50%, 55%, 60%, 65% by weight and the like. It should be appreciated that any two amounts of the aliphatic polyester recited herein can further represent end points in a preferred range of the aliphatic polyester. For example, the amounts of 30% and 45% by weight can represent the individual amounts of the aliphatic polyester as well as a preferred range of the aliphatic polyester between about 30% and about 45% by weight. Suitable aliphatic polyesters include co-polyester polymers with adipic acid, co-polyester polymers with succinic acid, poly(epsilon caprolactone) or a combination thereof.

In an embodiment, the organically coated calcium carbonate ranges from about 40% to about 75% by weight of the high heat resistant polymer composition. More specifically, the amount of the organically coated calcium carbonate can be about 40%, 45%, 50%, 55%, 60%, 65%, 70%, 75% by weight and the like. It should be appreciated that any two amounts of the organically coated calcium carbonate recited herein can further represent end points in a preferred range of the organically coated calcium carbonate. For example, the amounts of 45% and 65% by weight can represent the individual amounts of the organically coated calcium carbonate as well as a preferred range of the organically coated calcium carbonate between about 45% and about 65% by weight.

As used herein, the term "organically coated calcium carbonate" means a calcium carbonate partially or fully coated with an organic compound. For example, the organically coated calcium carbonate can be an EMforce® Bio additive sold by Specialty Minerals, Inc. The EMforce® Bio organically coated calcium carbonate is high aspect ratio calcium carbonate that has elongated morphology. It is characterized by a major axis of 1.08 microns, a minor axis of 0.25 microns and an average aspect ratio of 5.4 with the organic coating. The organically coated calcium carbonate enhances the crystallization behavior of PLA both from the melt and the glass state.

In an embodiment, the polymer compositions can be made by mixing or blending the respective constituents in the desired amounts. This may be performed according to any method known in by the skilled artisan. For example, the PLA and the aliphatic polyester may be mixed in pure form (e.g., blended by means of mill roll blending), and heated to a temperature chosen according to the general knowledge in the art such that at least one of the above-mentioned components is partially or essentially completely molten. The organically coated calcium carbonate can be added to this mixture at any suitable time in the manufacturing process.

The preparation of polyesters and co-polyesters is well known in the art, such as disclosed in U.S. Pat. No. 2,012,267, which is incorporated herein by reference. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million ("ppm"), based on total weight of the reactants (c.f., U.S. Pat. No. 6,020,393).

In addition to the PLA, the aliphatic polyester and the organically coated calcium carbonate, the polymer composition can be compounded with nanoparticles of a mineral material having a particular particle size. For example, nanoparticles according to the disclosure comprise particles can have a size definitely lower than the common size of current ground mineral equivalents that are usually of the order of several microns. According to an embodiment of the present disclosure, the nanoparticles have an average size ranging between about 20 and a maximum of 500 nanometers. In another embodiment, good performance can be achieved with nanoparticles of the desired mineral material having an average particle size ranging between about 200 to about 400 nanometers, e.g. about 250 nanometers. The polymer compositions can comprise between 1 and 32% by weight of the nanoparticles of the mineral materials.

Although particle size is an important parameter to achieve the desired performance, the extremely high degree of purity of the nanoparticle mineral selected can be significant. For example, the purity of the selected mineral material can have a degree of purity of at least 99.9% and preferably a degree of purity of at least 99.99% (e.g., pure silica or magnesium silicate). Special qualities of finely ground silica as provided by the specialized trade have proved suitable within the framework of the present disclosure.

In another embodiment, the polymer compositions of the present disclosure can include formulations that are modified with one or more plasticizers, flow promoters, polymer processing aids, slip agents, viscosity modifiers, chain extenders, nanoparticles, spherical glass beads, organic fillers, inorganic fillers, fibers, colorants, anti-microbial agents and the like. The additional components can be added to the polymer composition at any suitable time in the manufacturing process.

The plasticizers can be, for example, any suitable material that softens and/or adds flexibility to the materials they are added to. The plasticizers can soften the final product increasing its flexibility. Non-limiting examples of the plasticizers include, for example, polyethylene glycol, sorbitol, glycerine, soybean oil, caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate) or combination thereof.

The chain extenders can be oligomeric chain extenders. Preferred oligomeric chain extenders include styrene-acrylic copolymers or oligomers containing glycidyl groups incorporated as side chains. Several useful examples are described in the International Patent Application WO 03/066704 A1 assigned to Johnson Polymer, LLC, which is incorporated herein by reference. These materials are based on oligomers with styrene and acrylate building blocks that have desirable glycidyl groups incorporated as side chains. A high number of epoxy groups per oligomer chain is desired, at least about 10, preferably greater than about 15, and more preferably greater than about 20. These polymeric materials generally have a molecular weight greater than about 3000, preferably greater than about 4000, and more preferably greater than about 6000. These are commercially available from Johnson Polymer, LLC under the JONCRYL® trade name such as JONCRYL® ADR 4368. Another additive from Arkema Inc, Biostrength™ 700 can also enhance melt strength of the materials of the present disclosure. Biostrength™ 700 is an acrylic based copolymer.

Non-limiting examples of organic fillers include wood flour, seeds, polymeric particles, ungelatinized starch granules, cork, gelatins, wood flour, saw dust, milled polymeric materials, agar-based materials, and the like. Examples of inorganic fillers include calcium carbonate, titanium dioxide, silica, talc, mica, sand, gravel, crushed rock, bauxite, granite, limestone, sandstone, glass beads, aerogels, xerogels, clay, alumina, kaolin, microspheres, hollow glass spheres, porous ceramic spheres, gypsum dihydrate, insoluble salts, magnesium carbonate, calcium hydroxide, calcium aluminate, magnesium carbonate, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and the like. A wide variety of other inorganic fillers may be added as starting materials to the biodegradable compositions including, for example, metals and metal alloys (e.g., stainless steel, iron, and copper), balls or hollow spherical materials (such as glass, polymers, and metals), filings, pellets, flakes and powders (such as microsilica).

Non-limiting examples of fibers that may be incorporated into the polymer compositions include naturally occurring organic fibers, such as cellulosic fibers extracted from wood, plant leaves, and plant stems. These organic fibers can be derived from cotton, wood fibers (both hardwood or softwood fibers, examples of which include southern hardwood and southern pine), flax, abaca, sisal, ramie, hemp, and bagasse. In addition, inorganic fibers made from glass, graphite, silica, ceramic, rock wool, or metal materials may also be used.

Non-limiting examples of anti-microbial agents include metal-based agents such as zinc oxide, copper and copper compounds, silver and silver compounds, colloidal silver, silver nitrate, silver sulphate, silver chloride, silver complexes, metal-containing zeolites, surface-modified metal-containing zeolites or combination thereof. The metal-containing zeolites can include a metal such as silver, copper, zinc, mercury, tin, lead, bismuth, cadmium, chromium, cobalt, nickel, zirconium or a combination thereof. In another embodiment, the anti-microbial agents can be organic-based agents such as o-benzyl-phenol, 2-benzyl-4-chloro-phenol, 2,4,4'-trichloro-2'-hydroxydiphenyl ether, 4,4'-dichloro-2-hydroxydiphenyl ether, 5-chloro-2-hydroxy-diphenyl-methane, mono-chloro-o-benzyl-phenol, 2,2'-methylenbis-(4-chloro-phenol), 2,4,6-trichlorophenol or a combination thereof.

The polymer compositions of the present disclosure may be used for the production of various articles, such as e.g. molded articles and/or extruded articles. The term "molded article" (or "extruded article") as used in the present disclosure includes articles made according to a molding process (or an extrusion process). A "molded article" (or "extruded article") can also be part of another object, such as e.g. an insert in a container or a knife blade or fork insert in a corresponding handle. Injection molding, profile extrusion and thermoform extrusion are processes known to a skilled person and are described for example in Modern Plastics Encyclopedia, Published by McGraw-Hill, Inc. mid-October 1991 edition, which is hereby incorporated by reference.

Extruded articles include, for example, films, trash bags, grocery bags, container sealing films, pipes, drinking straws, spun-bonded non-woven materials, and sheets. Articles according to the present disclosure made from a profile extrusion formulation are, for example, drinking straws and pipes.

Articles according to the present disclosure made from a thermoform extrusion method are, for example, sheets for producing cups, plates and other objects that could be outside of the food service industry.

EXAMPLES

By way of example and not limitation, the following examples are illustrative of various embodiments of the present disclosure. The formulations below are provided for exemplification only, and they can be modified by the skilled artisan to the necessary extent, depending on the special features that are looked for. All percentages herein are based on the total weight of the composition unless noted otherwise.

Example 1

Unexpected results were obtained from several polymer compositions containing biopolymer materials in combination with relatively high loading of organically coated calcium carbonate (EM Force® Bio supplied by Specialty Mineral).

One example of a high heat resistant polymer composition included about 10% by weight PLA, about 45% by weight co-polyester polymer with adipic acid (EcoFlex® F) and about 45% by weight organically coated calcium carbonate (EM Force® Bio). The results showed that the polymer composition had a heat resistance level greater than 165° F. Previous work with loadings up to 20 wt. % of organically coated calcium carbonate only yielded a heat resistance of up to 125° F. These higher heat resistance level results were totally unexpected based on the history of biomaterials and the inherent low heat resistance of PLA composites.

PLA typically has a glass transition onset about 108° F., which affects the heat resistance behavior. Even with mineral filling of the PLA, only up to about 135° F. is heat resistance is observed. This observation of the heat resistance in the polymer composition having higher concentrations of organically coated calcium carbonate >165° F. is something that was not expected and was unique to this composition.

Example 2

| Property Test | Formulation #1 | 100% PLA |
|---|---|---|
| Flex. Mod. (psi) | 70,100.0 | 12,000.0 |
| Flex. Strength (psi) | 1,830.0 | 555,000.0 |
| Tensile Strength (psi) | 1,510.0 | 7,000.0 |
| % Elongation | 85.0 | 2.5 |

Formulation #1 = PLA/EcoFlex ® F/EM Force ® Bio: 10%/45%/45% (by weight)

With the additional loading of organically coated calcium carbonate up to 45 wt. % (EMforce® Bio), it was noted on finished molded articles that the part remains dimensionally stable up to >165° F. Without the high amount of the organically coated calcium carbonate (<20 wt. %), the finished molded particles will deform at temperatures ~115° F. This appeared to be allowing for the high mineral loading to impart isotropic behavior to the molded article when subjecting it to the increased temperature.

Another dynamic that was observed was that of superior impact when using ~45 wt. % organically coated calcium carbonate (EMforce® Bio) with values >160 pounds/sq. inch via drop dart testing—unusually high for such a high mineral loading—not expected~totally unique.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A polymer composition comprising:
a poly(lactic acid);
an aliphatic polyester; and
organically coated calcium carbonate,
wherein the organically coated calcium carbonate ranges from about 40% to about 75% by weight of the polymer composition.

2. The polymer composition of claim 1, wherein the poly (lactic acid) ranges from about 10% to about 45% by weight.

3. The polymer composition of claim 1, wherein the aliphatic polyester ranges from about 5% to about 65% by weight.

4. The polymer composition of claim 1, wherein the aliphatic polyester is selected from the group consisting of co-polyester polymer with adipic acid, co-polyester polymer with succinic acid, poly(epsilon caprolactone) and combinations thereof.

5. The polymer composition of claim 1, wherein the organically coated calcium carbonate ranges from about 45% to about 65% by weight.

6. The polymer composition of claim 1 further comprising nanoparticles of a mineral material.

7. The polymer composition of claim 6, wherein the nanoparticles comprise a size ranging between about 20 and about 500 nanometers.

8. The polymer composition of claim 6, wherein the nanoparticles have a degree of purity of at least 99.9%.

9. The polymer composition of claim 1 further comprising at least one component selected from the group consisting of plasticizers, flow promoters, polymer processing aids, slip agents, viscosity modifiers, chain extenders, nanoparticles, spherical glass beads, organic fillers, inorganic fillers, fibers, colorants, anti-microbial agents and combinations thereof.

10. A method of producing an article comprising a high heat resistant polymer composition, the method comprising:
combining a poly(lactic acid), an aliphatic polyester, and an organically coated calcium carbonate to produce a polymer blend, wherein the organically coated calcium carbonate ranges from about 40% to about 75% by weight of the polymer blend;
extruding the polymer blend to form an extrudate; and
forming the extrudate into an article.

11. The method of claim 10, wherein the article is selected from the group consisting of polymer foams, toys, computer casing, DVDs, toiletries, combs, consumer products, cellular phone casings, bags, foam material products, packaging, automobile parts, cookware and combinations thereof.

12. The method of claim 10, wherein the forming is done by a process selected from the group consisting of injection molding, thermoforming, film blowing, stretch blow molding, extrusion blow molding, extrusion coatings, profile extrusion, film extrusion, cast films, cast products and combinations thereof.

13. The method of claim 10, wherein the poly(lactic acid) ranges from about 10% to about 45% by weight.

14. The method of claim 10, wherein the aliphatic polyester ranges from about 5% to about 65% by weight.

15. The method of claim 10, wherein the aliphatic polyester is selected from the group consisting of co-polyester polymer with adipic acid, co-polyester polymer with succinic acid, poly(epsilon caprolactone) and combinations thereof.

16. The method of claim 10, wherein the polymer blend further comprises nanoparticles of a mineral material.

17. The method of claim 10, wherein the polymer blend further comprises at least one component selected from the group consisting of plasticizers, flow promoters, polymer processing aids, slip agents, viscosity modifiers, chain extenders, nanoparticles, spherical glass beads, organic fillers, inorganic fillers, fibers, colorants, anti-microbial agents and combinations thereof.

18. A method of making a polymer film, the method comprising:
    combining a poly(lactic acid), an aliphatic polyester, and an organically coated calcium carbonate to produce a polymer blend, wherein the organically coated calcium carbonate ranges from about 40% to about 75% by weight of the polymer blend; and
    forming a polymer film from the polymer blend.

19. The method of claim 18, wherein the poly(lactic acid) ranges from about 10% to about 45% by weight.

20. The method of claim 18, wherein the aliphatic polyester from about 5% to about 65% by weight.

21. The method of claim 18, wherein the aliphatic polyester is selected from the group consisting of co-polyester polymer with adipic acid, co-polyester polymer with succinic acid, poly(epsilon caprolactone) and combinations thereof.

22. The method of claim 18, wherein the organically coated calcium carbonate ranges from about 45% to about 65% by weight.

23. The method of claim 18, wherein the polymer blend further comprises nanoparticles of a mineral material.

24. The method of claim 18, wherein the polymer blend further comprises at least one component selected from the group consisting of plasticizers, flow promoters, polymer processing aids, slip agents, viscosity modifiers, chain extenders, nanoparticles, spherical glass beads, organic fillers, inorganic fillers, fibers, colorants, anti-microbial agents and combinations thereof.

25. A biodegradable article comprising:
    a polymer composition comprising a poly(lactic acid), an aliphatic polyester, and an organically coated calcium carbonate
    wherein the organically coated calcium carbonate ranges from about 40% to about 75% by weight of the polymer composition.

26. The biodegradable article of claim 25, wherein the poly(lactic acid) ranges from about 10% to about 45% by weight.

27. The biodegradable article of claim 25, wherein the aliphatic polyester ranges from about 5% to about 65% by weight.

28. The biodegradable article of claim 25, wherein the aliphatic polyester is selected from the group consisting of co-polyester polymer with adipic acid, co-polyester polymer with succinic acid, poly(epsilon caprolactone) and combinations thereof.

29. The biodegradable article of claim 25, wherein the organically coated calcium carbonate ranges from about 45% to about 65% by weight.

30. The biodegradable article of claim 25 further comprising nanoparticles of a mineral material.

31. The biodegradable article of claim 25 further comprising at least one component selected from the group consisting of plasticizers, flow promoters, polymer processing aids, slip agents, viscosity modifiers, chain extenders, nanoparticles, spherical glass beads, organic fillers, inorganic fillers, fibers, colorants, anti-microbial agents and combinations thereof.

32. An article comprising:
    a polymer composition comprising about 10% to about 45% by weight of a poly(lactic acid), about 5% to about 65% by weight of an aliphatic polyester, and about 40% to about 75% by weight of an organically coated calcium carbonate.

33. The article of claim 32 further comprising nanoparticles of a mineral material.

34. The article of claim 32, wherein the article is selected from the group consisting of polymer foams, toys, computer casing, DVDs, toiletries, combs, consumer products, cellular phone casings, bags, foam material products, packaging, automobile parts, cookware and combinations thereof.

* * * * *